(12) United States Patent
Wang

(10) Patent No.: US 10,584,301 B2
(45) Date of Patent: Mar. 10, 2020

(54) LOW BAKE TEMPERATURE FLUOROPOLYMER COATINGS

(71) Applicant: THE CHEMOURS COMPANY FC, LLC, Wilmington, DE (US)

(72) Inventor: Ying Wang, West Chester, PA (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 36 days.

(21) Appl. No.: 15/723,854

(22) Filed: Oct. 3, 2017

(65) Prior Publication Data

US 2018/0100116 A1 Apr. 12, 2018

Related U.S. Application Data

(60) Provisional application No. 62/407,160, filed on Oct. 12, 2016.

(51) Int. Cl.

| | | |
|---|---|---|
| C10M 147/02 | (2006.01) |
| A47J 36/02 | (2006.01) |
| C09D 179/08 | (2006.01) |
| B05D 5/08 | (2006.01) |
| B05D 7/14 | (2006.01) |
| C10M 173/02 | (2006.01) |
| B05D 1/02 | (2006.01) |
| B05D 3/02 | (2006.01) |

(52) U.S. Cl.
CPC .......... *C10M 147/02* (2013.01); *A47J 36/025* (2013.01); *B05D 5/083* (2013.01); *B05D 7/14* (2013.01); *C09D 179/08* (2013.01); *C10M 173/02* (2013.01); *B05D 1/02* (2013.01); *B05D 3/0254* (2013.01); *B05D 2202/15* (2013.01); *B05D 2202/35* (2013.01); *C08L 2205/02* (2013.01); *C08L 2205/03* (2013.01); *C10M 2213/06* (2013.01); *C10M 2213/062* (2013.01); *C10M 2217/044* (2013.01); *C10N 2250/08* (2013.01)

(58) Field of Classification Search
CPC .............. C10M 147/02; C10M 173/02; C10M 2213/06; C10M 2213/062; C10M 2217/044; A47J 36/025; C10N 2250/08; C08L 2205/02; C08L 2205/03; C09L 179/08; B05D 1/02; B05D 3/0254; B05D 5/083; B05D 7/14; B05D 2202/15; B05D 2202/35
See application file for complete search history.

(56) References Cited

U.S. PATENT DOCUMENTS

| | | |
|---|---|---|
| 4,014,834 A | 3/1977 | Concannon |
| 4,252,859 A | 2/1981 | Concannon |
| 4,351,882 A | 9/1982 | Concannon |
| 5,168,107 A | 12/1992 | Tannenbaum |
| 5,230,961 A | 7/1993 | Tannenbaum |
| 5,240,775 A | 8/1993 | Tannenbaum |
| 5,266,639 A | 11/1993 | Chapman et al. |
| 5,317,061 A * | 5/1994 | Chu .................. C08L 27/18 525/199 |
| 5,374,683 A | 12/1994 | Morgan |
| 5,434,001 A | 7/1995 | Yamada et al. |
| 5,547,761 A | 8/1996 | Chapman, Jr. et al. |
| 5,677,404 A | 10/1997 | Blair |
| 5,721,053 A | 2/1998 | Thomas |
| 5,789,083 A | 8/1998 | Thomas |
| 5,817,419 A | 10/1998 | Fryd et al. |
| 5,880,205 A | 3/1999 | Tannenbaum |
| 5,922,468 A | 7/1999 | Huesmann et al. |
| 6,197,904 B1 | 3/2001 | Gangal et al. |
| 6,291,054 B1 * | 9/2001 | Thomas ............ A47J 36/02 427/384 |
| 6,518,349 B1 | 2/2003 | Felix et al. |
| 7,357,793 B2 | 4/2008 | Pacetti |
| 7,736,571 B2 | 6/2010 | Trapp |
| 8,162,855 B2 | 4/2012 | Sakane et al. |
| 8,376,962 B2 | 2/2013 | Kousai et al. |
| 8,900,652 B1 | 12/2014 | Caballero et al. |
| 2002/0193706 A1 | 12/2002 | Ferrera |
| 2005/0106325 A1 | 5/2005 | Nishio |
| 2006/0121288 A1* | 6/2006 | Mochizuki ........ C08L 27/18 428/421 |
| 2006/0189897 A1 | 8/2006 | Poncet et al. |
| 2009/0048537 A1 | 2/2009 | Lydon et al. |
| 2009/0202782 A1 | 8/2009 | Cardoso et al. |

(Continued)

FOREIGN PATENT DOCUMENTS

| | | |
|---|---|---|
| WO | 94/14904 A1 | 7/1994 |
| WO | 00/69984 A1 | 11/2000 |
| WO | 2007/070601 A2 | 6/2007 |

OTHER PUBLICATIONS

Standard Test Method for Static and Kinetic Coefficients of Friction of Plastic Film and Sheeting, ASTM D 1894, West Conshohocken, Pennsylvania.

(Continued)

*Primary Examiner* — James C Goloboy
(74) *Attorney, Agent, or Firm* — Keith W. Palmer

(57) ABSTRACT

Provided are low coefficient of friction fluoropolymer one coat coatings having a relatively low bake temperature. The fluoropolymer coatings contain high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g.

15 Claims, No Drawings

(56) References Cited

U.S. PATENT DOCUMENTS

| | | | |
|---|---|---|---|
| 2010/0234816 A1 | 9/2010 | Cage et al. | |
| 2010/0314154 A1* | 12/2010 | Kitahara | C09D 127/18 |
| | | | 174/110 SR |
| 2011/0172604 A1 | 7/2011 | Wolfe | |
| 2013/0253519 A1* | 9/2013 | Mitchell | A61B 17/1671 |
| | | | 606/80 |
| 2014/0026628 A1* | 1/2014 | Sawyer | C05G 3/0088 |
| | | | 71/24 |

OTHER PUBLICATIONS

Standard Test Methods for Measuring Adhesion by Tape Test, ASTM D3359, 2010, West Conshohocken, Pennsylvania.
PCT International Search Report and Written Opinion (PCT/US2017/054794).

* cited by examiner

US 10,584,301 B2

LOW BAKE TEMPERATURE FLUOROPOLYMER COATINGS

FIELD OF THE DISCLOSURE

This invention relates to low bake temperature fluoropolymer coatings having low coefficient of friction.

BACKGROUND OF DISCLOSURE

Perfluoropolymer resins are known for their low surface energy and resultant low coefficient of friction and non-stick properties, as well as thermal and chemical resistance. Polytetrafluoroethylene (PTFE) has the lowest coefficient of friction of the perfluoropolymers, and is thus finds wide utility as a non-stick surface. However, PTFE presents processing difficulties and costs due to its very high molecular weight and as a result not being melt flowable and fabricable, and by having a relatively much higher melting point (~326° C.) than other perfluoropolymers. Fluorinated ethylene propylene (FEP, tetrafluoroethylene/hexafluoropropylene copolymer) is beneficially melt flowable and melt fabricable and has a lower melting point (~260° C.) which affords more manufacturing flexibility. However, FEP has a relatively higher coefficient of friction than PTFE, and so articles having a FEP surface will not afford quite as low a coefficient of friction and non-stick properties as articles surface coated with PTFE.

Due to their non-stick nature, it is also difficult to adhere perfluoropolymers to commercial substrates such that the perfluoropolymer coating does not separate or delaminate from the substrate upon use. There are a variety of "primer" or "binder" polymers having good adhesion to substrates as well as good adhesion to perfluoropolymers, and often a primer layer of such polymers is deposited on a substrate followed by a perfluoropolymer layer deposited on and adhered to the primer layer. The combination layered coating is known in this field as a "two coat" coating, being well adhered to the substrate by the primer polymer and also well adhered one polymer layer to the other. When the presence of a primer layer is not preferred, a "one coat" coating may be used. The one coat coatings involve a single coating of a composition that is an intimate physical mixture of perfluoropolymer and such binder polymer. The specific materials and their relative amounts are determined based on consideration of the substrate and the ultimate coating utility and properties desired.

Further complicating use of perfluoropolymer coatings is that certain polymer and metal substrates have relatively low limits of acceptable temperature exposure. In applications where such substrates would benefit from a perfluoropolymer coating, the low limit of acceptable temperature exposure of the substrate complicates and thus increases the costs of, or makes impossible, coating of such substrates or their articles with a perfluoropolymer coating by a thermal process. In the instance where the perfluoropolymer has a melting point above or near the limit of acceptable temperature exposure of a substrate, coating of the substrate by such molten perfluoropolymer, or coating of the substrate with perfluoropolymer particles (e.g., by solution coating or powder coating techniques) following by baking of the perfluoropolymer coating at or above the melting temperature of the perfluoropolymer can irreversibly damage the substrata. Here, "baking" and "baking temperature" refers to treatment of the coating at a temperature that results in the perfluoropolymer particles coalescing into a uniform and continuous coating upon melting, melt flow and mixing of the molten perfluoropolymer.

As an example, nickel titanium alloy (nitinol) is a simple binary mixture of nickel and titanium containing about 50 atomic percent each (about 55 percent by weight of nickel). Nitanol is stable against permanent temperature-induced metallurgical changes provided the exposure temperature is less than the annealing or aging temperatures. For many nitinol alloys, the aging temperature range is from 200° C. to 500° C. As the aging temperature of nitinol can fall below the melting point of the perfluoropolymers, conventional melt processing methods (e.g., melt extrusion, powder coating followed by baking near or above the perfluoropolymer melting point) are not available and as a result it is a challenge to coat nitinol surfaces with continuous low coefficient of friction coatings of perfluoropolymer. A like challenge exists for similarly coating polymers having melting point near or below the melting point of the perfluoropolymers.

A specific problem faced in producing articles for use in the medical field is the coating of a perfluoropolymer onto nitinol wire or the like to improve the surface friction characteristics of the wire (e.g., a medical wire such as a cardiac catheter guide wire), or using a pigment-containing perfluoropolymer as the surface layer of a medical wire so that medical care professionals are able to identify and differentiate one from another medical wires using only the color of, or patterned external design of, the wires. Perfluoropolymer coatings will typically exhibit superior low surface friction properties only after baking at a temperature at or above the perfluoropolymer melting point. For this reason, in the process for their manufacture, such medical guide wires coated with perfluoropolymer are typically subjected to a baking treatment for a period of time where the baking temperature is at or above the melting point of the perfluoropolymer. However, such a method has a problem in that the physical properties (e.g., elastic modulus) of the nitinol wire is negatively impacted when the perfluoropolymer-coated medical guide wire is baked. Moreover, when such a perfluoropolymer-coated medical guide wire is baked, if the perfluoropolymer additionally contains a colored pigment, it is undesirable for the color of the pigment to fade or undesirably change color and thereby not produce the desired medical guide wire having a colored outer jacket.

There remains a commercial need for low coefficient of friction fluoropolymer one coat coatings having a low bake temperature allowing for uniform and continuous coating of certain polymer and metal substrates having relatively low limits of acceptable temperature exposure.

SUMMARY OF THE DISCLOSURE

The present invention solves the need for low coefficient of friction fluoropolymer one coat coatings having a low bake temperature, by in one embodiment providing a fluoropolymer coating comprising i) high temperature resistant polymer binder (herein sometimes referred to as "polymer binder"), ii) low melting tetrafluoroethylene/hexafluoropropylene copolymer (herein sometimes referred to as "FEP") having a melting point of below 255° C. by the method of ASTM D 4591, and iii) low molecular weight polytetrafluoroethylene having a heat of crystallization of at least about 50 J/g (herein sometimes referred to as "PTFE"). Another aspect of the present invention is to provide a medical wire, and method for the manufacture of a medical wire, that has the superior low surface friction qualities of a perfluoropolymer while sustaining the desirable physical properties (e.g., elastic modulus) of the temperature-sensitive substrate (e.g., nitinol). Another aspect of the present invention is to provide a colored medical wire, and method for the manufacture of a colored medical wire, that has the superior low surface friction qualities of a perfluoropolymer while sustaining the desirable physical properties (e.g., elastic modulus) of the temperature-sensitive substrate (e.g., nitinol) while maintaining the color of the pigment contained in the perfluoropolymer.

The present fluoropolymer coating has a bake temperature that in one embodiment equates to the melting point of the FEP. In one embodiment the FEP has a melting point of about 255° C. or below, preferably 240° C. or below, by the method of ASTM D 4591.

In one embodiment the FEP component of the coating has a melting point that falls in the range of from about 40° C. below the melting point of the polymer binder to no greater than about 25° C. above the melting point of the polymer binder.

In one embodiment the FEP of the coating has a melt flow rate of about 20 to about 60 by ASTM D 1238, when measured at a temperature of 297° C. using an applied weight of 2,060 grams.

In another embodiment the fluoropolymer coating contains from about 25 to about 50 weight percent of the polymer binder from about 50 to about 75 weight percent of the FEP and the PTFE, the weight percents based on the combined dry weights of the polymer binder, the FEP and the PTFE. In one embodiment the fluoropolymer coating contains from about 30 to about 50 weight percent of the polymer binder from about 50 to about 70 weight percent of the FEP and the PTFE, the weight percents based on the combined dry weights of the polymer binder, the FEP and the PTFE. In another embodiment the fluoropolymer coating contains from about 25 to about 45 weight percent of the polymer binder from about 55 to about 75 weight percent of the FEP and the PTFE, the weight percents based on the combined dry weights of the polymer binder, the FEP and the PTFE.

In one embodiment the fluoropolymer of the coating comprises from about 20 to about 60 weight percent of the FEP and from about 40 to about 80 weight percent of the PTFE, the weight percents based on the combined dry weights of the FEP and the PTFE.

Another aspect of the present invention is a composition for forming a fluoropolymer coating comprising solvent, high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g.

Another aspect of the present invention is a process for forming a fluoropolymer coating on a substrate, comprising: i) applying to the surface of the substrate a coating composition comprising solvent, high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g, ii) removing the solvent from the coating composition on the substrate, iii) heating the coating composition deposited on the substrate at a temperature sufficient to melt the polymer binder and the tetrafluoroethylene/hexafluoropropylene copolymer, and, iv) cooling the coating composition to a temperature below the melting points of the polymer binder and the tetrafluoroethylene/hexafluoropropylene copolymer to form the fluoropolymer coating on the substrate.

Another aspect of the present invention is a coated substrate having a coating composition comprising high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g.

In one embodiment the substrate is nickel/titanium alloy (nitinol).

In one embodiment the dry film thickness of the resultant fluoropolymer coating is from about 0.1 to about 0.4 mils.

In one embodiment the fluoropolymer coating of the coated substrate has a static coefficient of friction of about 0.2 or less and a kinetic coefficient of friction of about 0.17 or less, the coefficients of friction being measured by the method of ASTM D 1894. In one embodiment the fluoropolymer coating of the coated substrate has a static coefficient of friction of about 0.2 or less and a kinetic coefficient of friction of about 0.14 or less, the coefficients of friction being measured by the method of ASTM D 1894.

DETAILED DESCRIPTION

The high temperature resistant polymer binder component of the present coating composition comprises polymer which is film-forming upon heating to fusion, is thermally stable and has a sustained use temperature of at least about 140° C. This component is well known in primer applications for non-stick finishes, for adhering fluoropolymer-containing layers to substrates, particularly metal substrates and for film-forming within and as part of the layer. The perfluoropolymers of the present invention by themselves have little to no adhesion to a substrate. The binder is generally non-fluorine containing and adheres strongly to many commercial substrates such as metals and plastics and also adheres strongly to the perfluoropolymers of the present invention. Preferred binders are those that are soluble in a solvent, and in some embodiments, preferably a solvent that is miscible with water.

Example polymer binders of the present invention include one or more of: (1) polysulfones, which in one embodiment are amorphous thermoplastic polymers with a glass transition temperature of about 185° C. and a sustained maximum service temperature of about 140 to 160° C., (2) polyethersulfones (PES), which in one embodiment are amorphous thermoplastic polymers with a glass transition temperature of about 230° C. and a sustained maximum temperature service of about 170 to 190° C., (3) polyimides, polyamide imides (PAI) and/or polyamic acid salt which converts to polyamide imide, which imides crosslink upon heating of the coating to fuse it, and which in one embodiment have a sustained maximum service temperature in excess of 250° C., and (4) polyphenylene sulfide, which in one embodiment has a glass transition temperature of about 126° C. and a sustained maximum service temperature of about 218° C., among others. All of these polymer binders are thermally stable and dimensionally stable at temperatures within their sustained service range and below, and they are wear resistant. These polymers strongly adhere to many commercial substrates such as metals and plastics.

One skilled in the art will recognize the possibility of using mixtures of high temperature resistant polymer binders in the practice of the present invention, provided that the polymer binders are all soluble in the same solvent.

The high temperature resistant polymer binders are commercially available.

The low melting tetrafluoroethylene/hexafluoropropylene copolymers of the present invention are partially crystalline copolymers of tetrafluoroethylene (TFE) and hexafluoropropylene (HFP), optionally further containing a minor amount of an additional perhalogenated comonomer. Such tetrafluoroethylene/hexafluoropropylene (TFE/HFP) copolymers are also referred to in this field and herein as fluorinated ethylene propylene copolymers, or "FEP". In the present TFE/HFP copolymers, the HFP content is typically about 6 to 27 weight percent, preferably about 8 to 20 weight percent, more preferably 10 to 18 weight percent. In one embodiment, the TFE/HFP copolymers includes an amount of perfluoro(alkyl vinyl ether) (PAVE) comonomer to modify properties. In one embodiment the is a TFE/HFP/PAVE copolymer, wherein the PAVE alkyl group contains 1 to 4 carbon atoms. Preferred PAVE monomers are perfluoro(methyl vinyl ether) (PMVE), perfluoro(ethyl vinyl ether) (PEVE) and perfluoro(propyl vinyl ether) (PPVE). In one embodiment the TFE/HFP/PAVE copolymers have an HFP content of about 6 to 27 weight percent, preferably 8 to 20 weight percent, and PAVE content of about 0.2 to 5 weight percent, preferably 1 to 3 weight percent, with the remainder of the copolymer being TFE to total 100 weight percent of the copolymer. The TFE/HFP copolymers are partially crystalline, that is, they are not elastomers. By partially crystalline is meant that the polymers have some crystallinity and are characterized by a detectable melting point measured according to ASTM D 4591, and a melting endotherm of at least about 3 J/g.

The low melting TFE/HFP copolymers of the present invention have a melting point (Tm) in the range of from about 180° C. to below 255° C., preferably in the range of about 180° C. to about 235° C. In one embodiment, the low melting TFE/HFP copolymers of the present invention have a Tm of about 250° C. or below. In another embodiment, the Tm is about 240° C. or below. The melting point of the TFE/HFP copolymer is determined by the method of ASTM D 4591.

The low melting TFE/HFP copolymers of the present invention have melt flow rate of 20-60 grams/10 minute, measured by the method of ASTM D-1238 at a temperature of 297° C. and a load of 2,060 g.

In one embodiment, the TFE/HFP copolymers are chosen to have Tm values close to the melting point of the polymer binder. This range is from 40° C. below the melting point of the polymer binder to 25° C. above the melting point of the polymer binder, preferably from 30° C. below the melting point of the polymer binder to 15° C. above the melting point of the polymer binder, and more preferably from 20° C. below the melting point of the polymer binder to 5° C. above the melting point of the polymer binder.

Manufacture of low melting TFE/HFP copolymers of utility in the present invention are known in the art. For example, incorporated herein by reference are U.S. Pat. Nos. 5,266,639 and 5,374,683, which disclose the manufacture of copolymers of TFE and HFP having higher HFP content and lower melting point than conventional commercial FEP, which has a melting point above 255° C.

The low molecular weight polytetrafluoroethylene (PTFE) of the present invention is a tetrafluoroethylene homopolymer or a modified PTFE containing a small amount, preferably 1 weight percent or less, of a comonomer, for example, hexafluoropropylene, perfluoro(alkyl vinyl ether), fluoroalkylethylene or chlorotrifluoroethylene. The low molecular weight of this PTFE is characterized by high crystallinity with a heat of crystallization of about 50 J/g or greater. A typical range of heat of crystallization is from about 50 to about 90 J/g. The low molecular weight PTFE can be made directly from the polymerization of tetrafluoroethylene in the presence of a chain transfer agent. It can also be made by irradiating or by pyrolyzing high molecular weight PTFE of the kind known as "molding powder" (also known as "granular" PTFE or "fine powder" PTFE), or its moldings made therefrom. The low molecular weight PTFE made by irradiation is preferred. The term "low molecular weight" as it applied to PTFE is used in contrast to the very high molecular weight of molding powder PTFE or fine powder PTFE, which are characterized by a much lower heat of crystallization, e.g. less than about 35 J/g. The heat of crystallization is generally used to characterize the low molecular weight PTFE (sometimes referred to as micropowder, as in ASTM D 5675). PTFE having a heat of crystallization of less than about 50 J/g, for example, PTFE "molding powder" or "fine powder", is not a satisfactory component of the compositions of the present invention.

The present fluoropolymer coating composition comprises polymer binder and perfluoropolymers. The perfluoropolymers comprise a low melting TFE/HFP copolymer and a low molecular weight PTFE. The polymer binder is present in the composition in an amount sufficient to provide the desired amount of adhesion between the coating and substrate, but not so much so as to negatively effect the properties afforded to the coating by the perfluoropolymers, specifically, low coefficient of friction.

In one embodiment the present coating compositions contain from about 20 to about 60 weight percent of polymer binder and from about 40 to about 80 weight percent perfluoropolymers. In another embodiment the present coating compositions contain about 30 to about 50 weight percent of polymer binder and about 50 to about 70 weight percent perfluoropolymers. The weight percents defined here are based on the combined dry weights of the polymer binder and perfluoropolymers (TFE/HFP copolymer and low molecular weight PTFE).

The present fluoropolymer coating composition comprises the perfluoropolymers low melting tetrafluoroethylene/hexafluoropropylene copolymer and low molecular weight polytetrafluoroethylene. The coefficient of friction of the coating composition will be desirably minimized by maximizing the amount of polytetrafluoroethylene. However, coating compositions containing solely polytetrafluoroethylene as the perfluoropolymer will be undesirably rough and non-uniform in thickness and composition. Use of the low melting TFE/HFP copolymer in the present coating compositions together with the polymer binder and low molecular weight PTFE results in coatings that are smooth and uniform in thickness and composition, and also have low coefficient of friction.

In one embodiment this result is achieved by present coating compositions containing from about 10 to about 60 weight percent of the tetrafluoroethylene/hexafluoropropylene copolymer and from about 40 to about 90 weight percent of the polytetrafluoroethylene, the weight percents defined based on the combined dry weights of the perfluoropolymers tetrafluoroethylene/hexafluoropropylene copolymer and polytetrafluoroethylene. In another embodiment this result is achieved by present coating compositions containing about 20 to about 50 weight percent of the tetrafluoroethylene/hexafluoropropylene copolymer and from about 50 to about 80 weight percent of the polytetrafluoroethylene. In another embodiment this result is achieved by present coating compositions containing about 20 to about 60 weight percent of the tetrafluoroethylene/hexafluoropropylene copolymer and from about 40 to about 80 weight percent of the polytetrafluoroethylene.

The fluoropolymer coating of the present invention is useful as a single coating (one coat coating) or as a layer in a multi-layer coating system. The fluoropolymer coatings can be made from isolated and dried composition, either by depositing the dried powder by one of various commercial powder coating techniques or by suspending the components in a suitable solvent, optionally in the presence of suitable surfactants or viscosity modifiers as desired, and depositing the composition on a substrate by known commercial wet coating methods.

In another embodiment, the fluoropolymer composition can be made into a sprayable powder according to the teachings of Felix et al. in U.S. Pat. No. 6,518,349 by spray drying a liquid dispersion of primary particles of the low melting tetrafluoroethylene/perfluoroolefin copolymer together with high temperature resistant polymer binder, to produce friable granules of agglomerated particles of tetrafluoroethylene/perfluoroolefin copolymer and high temperature resistant polymer binder. By friable is meant that the granules can be reduced to a smaller particle size (comminuted) without causing appreciable particle deformation. Blends of polymers and components formed by the spray dried method are more uniform than those formed by conventional mechanical methods of blending powders of individual components after powder formation. Multicomponent powders formed by spray drying do not segregate during electrostatic application thereby providing more uniform coatings on substrates.

In one embodiment the present invention comprises a liquid composition for applying a fluoropolymer coating to a substrate comprising a solvent, a high temperature resistant polymer binder, low melting TFE/HFP copolymer having a melting point of below 255° C. by the method of ASTM D 4591, and low molecular weight PTFE having a heat of crystallization of at least about 50 J/g. Solvent is generally a liquid that allows for delivery of the components of the fluoropolymer coating composition to the surface of a substrate in a controlled fashion to form a continuous coating of uniform thickness. The amount of solvent in the composition used for applying the fluoropolymer coating to a substrate is generally from about 50 to about 90 weight percent of the composition, and the amount of polymeric binder and perfluoropolymers is generally from about 10 to about 50 weight percent (on a solid basis), preferably about 15 to about 25 weight percent. Other optional components of this composition include about 1 to about 5 weight percent of water-miscible cosolvent, about 1 to about 10 weight percent of anionic or nonionic surfactant, and 10 weight percent or less of pigment.

In a preferred embodiment, the solvent is water. The perfluoropolymer components are generally commercially available as dispersions of the perfluoropolymer in water, which is the preferred form for the compositions of the present invention for ease of application and environmental stewardship. By "dispersion" is meant that the polymer particles are stably dispersed in the aqueous medium, so that settling of the particles does not occur within the time when the dispersion will be used; this is achieved by the small size of the perfluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

In one embodiment organic liquid is used as solvent in order to achieve an intimate mixture of perfluoropolymer and polymer binder. The organic liquid may be chosen because a binder dissolves in that particular liquid. If the binder is not dissolved in the liquid, then the binder can be finely divided particles and be dispersed with the perfluoropolymer in the liquid. The resultant coating composition can comprise perfluoropolymer dispersed in organic liquid and polymer binder, either dispersed in the liquid as fine particles or dissolved in order to achieve the intimate mixture desired. The characteristics of the organic liquid will depend upon the identity of the polymer binder and whether a solution or dispersion thereof is desired. Examples of such organic liquids include N-methylpyrrolidone, butyrolactone, high boiling aromatic solvents, alcohols, mixtures thereof, among others. The amount of the organic liquid will depend on the flow characteristics desired for the particular coating operation.

In another aspect the present invention relates to a process for forming a fluoropolymer coating on a substrate, comprising: i) applying to the surface of the substrate a coating composition comprising a solvent, high temperature resistant polymer binder, low melting TFE/HFP copolymer having a melting point of below 255° C. by the method of ASTM D 4591, and low molecular weight PTFE having a heat of crystallization of at least about 50 J/g, ii) removing the solvent from the coating composition on the substrate, iii) heating the coating composition of the substrate at a temperature sufficient to melt the polymer binder and the TFE/HFP copolymer, and iv) cooling the coating composition to a temperature below the melting points of the polymer binder and the tetrafluoroethylene/hexafluoropropylene copolymer to form the fluoropolymer coating on the substrate.

The present process includes applying to the surface of a substrate a coating composition comprising a solvent, high temperature resistant polymer binder (binder), low melting TFE/HFP copolymer having a melting point of below 255° C. by the method of ASTM D 4591 (FEP), and low molecular weight PTFE having a heat of crystallization of at least about 50 J/g (PTFE). The coating composition comprising polymer binder, FEP and PTFE components can be applied to substrates by suspending the dried powders of the components in a suitable solvent with suitable surfactants or viscosity modifiers as desired and depositing the composition by a wet coating technique. In another embodiment, the mixed dried powders of the components are deposited in the dried form by well known conventional techniques, e.g., hot flocking, electrostatic spraying, electrostatic fluidized bed, rotolining and the like. Preferred is electrostatic spraying such as triboelectric spraying or corona spraying.

The present process involves removing solvent from the composition coated on the substrate. This can be accomplished by allowing the substrate to stand for a sufficient amount of time to allow solvent from the coating composition on the substrate to evaporate. Optionally, air flow and warming of the substrate are used to accelerate the evaporation of the solvent.

The present process includes heating (baking) the coating composition of the substrate at a temperature sufficient to melt the polymer binder and the TFE/HFP copolymer. Baking of the coating is carried out for a period of time sufficient to allow for the melting of the particles of the composition components i) high temperature resistant polymer binder and ii) low melting TFE/HFP and the coalescing of the molten polymer particles and melt flow of the molten composition into a uniform and continuous coating having the particles of the low molecular weight PTFE distributed throughout. In one embodiment, the tetrafluoroethylene/hexafluoropropylene copolymer has a melting point that falls in the range of from about 40° C. below the melting point of the polymer binder to about 25° C. above the melting point of the polymer binder. The baking temperature is at least about the melting point of the higher melting of the i) high temperature resistant polymer binder and ii) low melting TFE/HFP. In one embodiment the baking temperature is at least about higher than the higher melting of the i) high temperature resistant polymer binder and ii) low melting TFE/HFP, and the baking period is at least about 30 minutes.

For typical FEP having a melting point of above 250° C., it requires much higher temperature than its melting point or extended baking time to achieve the smooth coating film.

In another aspect the present invention relates to a coated substrate having a coating composition comprising high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g.

While any suitable substrate can be coated, examples of typical substrates include metal, including steel, high carbon steel, stainless steel, aluminized steel and aluminum, nickel or its alloy, copper, silver among others.

In one embodiment contemplated herein as substrates are those certain polymer and metal substrates having relatively low limits of acceptable temperature exposure that fall below the melting temperature of perfluoropolymers. In applications where such substrates would benefit from perfluoropolymer coatings, the low limit of acceptable temperature exposure of the substrate complicates and thus increases the costs of, or makes impossible, coating of such substrates or their articles with a perfluoropolymer coating. In the instance where the perfluoropolymer has a melting point above or near the limit of acceptable temperature exposure of a substrate, coating of the substrate by such molten perfluoropolymer, or coating of the substrate with perfluoropolymer particles (e.g., by solution coating or powder coating techniques) following by baking of the perfluoropolymer coating can irreversibly damage the substrate.

One embodiment of the present substrates is nickel titanium alloy (nitinol), for example, a simple binary mixture of nickel and titanium containing about 50 atomic percent each (about 55 percent by weight of nickel). Nitanol is stable against permanent temperature-induced metallurgical changes provided the exposure temperature is less than the annealing or aging temperatures. In one embodiment of the present invention, the substrate is nickel titanium alloy (nitinol) which may not be exposed to temperature above 260° for 20-30 minutes otherwise its mechanical properties would be negatively altered. In one embodiment of the coated substrate the substrate comprises nitinol. In one embodiment of the coated substrate, the coated substrate comprises a nitinol medical wire with a present fluoropolymer coating having the superior low surface friction qualities of a perfluoropolymer while sustaining the desirable physical properties (e.g., elastic modulus) of the nitinol. In one embodiment of the coated substrate, the coated substrate comprises a colored nitinol medical wire with a present fluoropolymer coating containing colored pigment, that has the superior low surface friction qualities of a perfluoropolymer while sustaining the desirable physical properties (e.g., elastic modulus) of the nitinol while maintaining the color of the pigment contained in the fluoropolymer coating on the nitinol wire.

In one embodiment of the coated substrate the dry film thickness of the coating is from about 0.1 to about 0.4 mils.

In one embodiment of the coated substrate the coating has a static coefficient of friction of about 0.2 or less and a kinetic coefficient of friction of about 0.17 or less, said coefficients of friction measured by the method of ASTM 1894. In one embodiment of the coated substrate the coating has a static coefficient of friction of about 0.2 or less and a kinetic coefficient of friction of about 0.14 or less, said coefficients of friction measured by the method of ASTM 1894.

EXAMPLES

Test Methods

Adhesion was tested by the postboiling Cross-Hatch Tape Adhesion test method (PWA-CH). A grid of 18×18 mm with 1,000 squares was cut through the coating to the substrate on a coated panel. After exposing the panel to boiling water for 30 minutes, ASTM D3359 "Standard Test Methods for Measuring Adhesion by Tape Test" procedure was followed.

Coefficient of Friction measurements are carried out on coated flat panels by the method of ASTM 1894 "Standard Test Method for Static and Kinetic Coefficients of Friction of Plastic Film and Sheeting".

Corrosion resistance: To test the corrosion resistance property, a saline soak test was carried out on coated wire by the method of ISO 11070 "Sterile single-use intravascular catheter introducers corrosion test". The coated wire was soaked in 0.9% NaCl solution for one hour and checked by the naked eye for visible cracking or color change.

Color fastness test: To test if the coating is fully cured under the bake conditions (temperature and time), IPA and MEK rub tests (ASTM D5402) was carried out on by rubbing the coated panel or coated wire by hand with a cotton cloth soaked with IPA or MEK. Release of color from the coating to the cloth indicates incomplete curing of the coating.

Materials—description of some of the materials used in the present examples:

Polyamic acid polymer—polyamide acid polymer as prepared in example 1 of U.S. Pat. No. 4,014,834.

PTFE Micropowder FLUON TL-171E—obtained from Asahi Chemical Industry Co., melting point 332° C.

PTFE Micropowder Zonyl®—aqueous dispersion of PTFE micropowder corresponding to Zonyl® MP-1600, having a melting point of 328° C., and zero melt flow rate by the present melt flow rate of the low melting FEPs method. Manufactured by Chemours.

Low melt FEP—powder arising from spray drying an aqueous dispersion of low melting TFE/HFP copolymer having 16 wt % HFP content, melting point 240-260° C., melt flow rate 37.7 g/10 min. Melt flow rate of low melting FEP polymers of these examples was measured by the method of ASTM D-1238 at a temperature of 297° C. and a load of 2,060 g. Manufactured by Chemours.

Regular FEP, TE-9827 product manufactured by Chemours, aqueous dispersion contains 60% solid, melting point 260° C., MFR 1 grams/10 minutes. Melt flow rate was measured by the method of ASTM D-1238 at a temperature of 297° C. and a load of 2,060 g.

Blue dispersion—aqueous dispersion of a mixture of commercially available blue pigments.

Comparative Example One—Onecoat Blue

The following formulations were prepared by mixing and grinding the following ingredients:

| Ingredient | Supplier | % wt. |
|---|---|---|
| Water | NA | 59.23 |
| Tergitol TMN-6 | Dow Chemical | 0.62 |
| Dipropylene glycol dimethyl ether | Aldrich | 1.3 |
| Polyamic acid polymer | Chemours | 19.52 |
| PTFE Micropowder FLUON TL-171E | Asahi Chemical | 6.79 |
| TE-9827 (Regular FEP dispersion, 60% solids) | Chemours | 5.81 |
| Alumina modified silica | Chempoint | 2.12 |
| Blue pigment dispersion | Chemours | 4.62 |

Stainless steel panels were cleaned with acetone and isopropanol, followed by heat treatment at 400° C. for 30 minutes in an oven. The substrate was then coated with comparative fluoropolymer coating composition by spray coating and dried for 15-20 minutes at 115-150° C. The panels were then baked at different temperatures as listed in the table below for 30 minutes. The dry film thickness is 4-10 micrometers.

Test results showed that when the coating is baked for 30 minutes at or below 343° C., the coating was not fully cured. Although the good adhesion was achieved, color was taken off by the MEK rub test, indicating that the particles of the fluoropolymer coating composition have not completed coalescing to form a uniform and smooth coating, and such particles are being released from the coating surface to the cotton cloth during the relatively low abrasion of the rub test. The coefficient of friction was high because it is believed that low MFR regular FEP TE-9827 did not sufficiently melt flow and particles coalesce to the formation of a uniform smooth film under the current bake conditions. A minimum bake temperature of at least 363° C. is needed to form a fully baked coating of such regular FEP. The coating achieved low coefficient of friction and passed the MEK rub test. Further, at this minimal bake temperature, the coating could not maintain a good blue color, but instead turned green. This minimal baking temperature would not be suited for coating of high temperature sensitive wires, such as nitinol, which can't withstand such high temperature.

Comparative Example One Results

| Baking temperature | Panel color | Static coefficient of friction | Kinetic coefficient of friction | Color fastness test | Adhesion test |
|---|---|---|---|---|---|
| 315° C. | Blue | 0.195 | 0.122 | Blue color off | pass |
| 343° C. | dark blue | 0.183 | 0.162 | light blue color off | pass |
| 363° C. | Blueish Green | 0.136 | 0.11 | None | pass |
| 371° C. | deep green | 0.14 | 0.118 | none | pass |

Examples 1-2—Onecoat Blue

The following formulations were prepared by mixing and grinding the following ingredients:

| Ingredient | Supplier | Example 1 % wt. | Example 2 % wt. |
|---|---|---|---|
| Water | NA | 60.80 | 59.23 |
| Tergitol TMN-6 | Dow Chemical | 0.63 | 0.62 |
| Dipropylene glycol dimethyl ether | Aldrich | 1.33 | 1.30 |
| Polyamic acid polymer | Chemours | 20.03 | 19.52 |
| PTFE Micropowder FLUON TL-171E | Asahi Chemical | 6.97 | 6.79 |
| Low melt FEP powder | Chemours | 3.32 | 5.81 |
| Alumina modified silica | Chempoint | 2.18 | 2.12 |
| Blue pigment dispersion | Chemours | 4.74 | 4.62 |

Stainless steel panels were cleaned with acetone and isopropanol, followed by heat treatment at 400° C. for 30 minutes in an oven. Each substrate was then coated with Example 1 or 2 fluoropolymer coating composition by spray coating and dried for 15-20 minutes at 115-150° C. The substrate was then further baked for 30 minutes at 329° C. resulting in a 4-10 micrometer thick coating on the substrate. The panels were tested for the following properties:

Example 1 and 2 Coating Observations

| Example #, Baking Temperature | Panel color | Static Coefficient of Friction | Kinetic Coefficient of Friction | Adhesion | Color fastness test |
|---|---|---|---|---|---|
| Example 1, 329° C. | Blue | 0.132 | 0.12 | Pass | light blue color off |
| Example 2, 329° C. | Blue | 0.103 | 0.144 | Pass | None |

The results demonstrated that when the FEP is changed from regular FEP to low melt FEP, a low coefficient of friction can be achieved at 329° C. and the panel not shed the blue color (coating) upon administration of the color fastness test. Shedding of the light blue color upon carrying out the MEK rub test on the example 1 coated panel indicated the example 1 coating was not fully cured. When the amount of low melt FEP (Ex. 2) is increased, the coating achieved full bake under the same bake conditions and achieved a beneficially low coefficient of friction.

Example 3—Onecoat Blue

When attempting to lower the bake temperature further with an example 2 coating, the coating was found to not be fully cured at 287° C. after 30 minutes, evidenced by the panel showing some fine blue color was rubbed off upon performing a MEK rub color fastness test.

The following example 3 composition was then prepared containing relatively more low melt FEP. This provided a composition which can be fully cured to a uniform and smooth coating at the relatively low temperature of 287° C. and baking time of 30 minutes.

Example 3 Composition

| Ingredient | Supplier | % wt. |
|---|---|---|
| Water | Na | 43.20 |
| Tergitol TMN-6 | Dow Chemical | 0.74 |
| Dipropylene glycol dimethyl ether | Aldrich | 1.55 |
| Polyamic acid polymer | Chemours | 22.98 |
| Low melt FEP powder | Chemours | 6.94 |
| PTFE Micropowder Zonyl ® - aqueous dispersion (55% solids) | Chemours | 14.71 |
| Alumina modified silica | Chempoint | 2.54 |
| Blue pigment dispersion | Chemours | 7.35 |
| Total | | 100.00 |

Stainless steel panels were cleaned with acetone and isopropanol, followed by heat treatment at 400° C. for 30 minutes in an oven. The substrates were then each coated with an Example 2 or Example 3 fluoropolymer coating compositions by spray coating and dried for 15-20 minutes at 115–150° C. Each coated substrate was then further baked for 30 minutes at 287° C., resulting in a 4-10 micrometer thick coating on the substrate. The panels were tested for the following properties:

Example 2 and 3 Coating Observations

| Example #, Baking Temperature | Panel color | Static Coefficient of Friction | Kinetic Coefficient of Friction | Adhesion | Color fastness test |
|---|---|---|---|---|---|
| Example 2, 287° C. | Blue | 0.116 | 0.129 | Pass | very fine color off |
| Example 3, 287° C. | Blue | 0.127 | 0.109 | Pass | None |

Stainless Steel wire was cleaned with acetone and isopropanol, followed by heat treatment at 400° C. for 30 minutes in an oven. Nitinol wire was cleaned with acetone and isopropanol, and then dried at 65° C. for 30 minutes in an oven. Both wires were coated with Example 3 fluoropolymer coating composition by spray coating. The coated wire was dried for 15-20 minutes at 115–130° C. and then cured for 30 minutes at 240° C.

All of the coated stainless steel wires and nitinol wires passed the saline soak (soak for 3 hours) test, which indicated the coating has good corrosion resistant property as coating for wires.

Example 4—Onecoat Green

The following formulation was prepared by mixing and grinding the following ingredients:

| Ingredient | Supplier Name | % Wt. |
|---|---|---|
| Deionized water | NA | 44.80 |
| Tergitol TMN-6 | Dow Chemical | 0.76 |
| Dipropylene glycol dimethyl ether | Aldrich | 1.61 |
| Sodium Lauryl Sulfite | Aldrich | 0.48 |
| Polyamic acid polymer | Chemours | 23.83 |
| Low Melt FEP Powder | Chemours | 7.20 |
| PTFE Micropowder Zonyl ® - aqueous dispersion (55% solids) | Chemours | 15.25 |
| Ludox colloidal silica | Chempoint | 2.63 |
| Sicopal Green K9710 | BASF | 3.43 |

Stainless steel panel and wire was cleaned with acetone and isopropanol, followed by heat treatment at 400° C. for 30 minutes in an oven. The substrates were then coated with example 4 fluoropolymer coating composition by spray coating and dried for 15-20 minutes at 115-150° C. The substrates were then baked for 30 minutes at 240° C., resulting in a 4-10 micrometer thick coating on each substrate.

Nitinol wire was cleaned with acetone and isopropanol, and then dried at 65° C. for 30 minutes in an oven and then coated with Example 4 fluoropolymer coating composition by spray coating. The coated nitinol wire was dried for 15-20 minutes at 115-130° C. The coated nitinol wire was then further cured for 30 minutes at 240° C.

The coated panels passed both PWA-CH adhesion and IPA and MEK rub tests. These demonstrated the coating was fully baked at ~240° C. and has good adhesion to the smooth stainless steel substrate. The coating surface was very smooth and slippery.

Both the coated stainless steel wires and nitinol wires passed saline soak (soak for 3 hours) test, which indicated the coating has good corrosion resistant property as coating for wires.

Example 5 and Comparative Examples 2-5 (C2-C5)

The following formulations were prepared by mixing and grinding the following ingredients (table numerical values are in weight percent):

| | | Examples | | | | |
|---|---|---|---|---|---|---|
| Ingredient | Supplier | C2 | C3 | 5 | C4 | C5 |
| Water | — | 60.45 | 49.11 | 55.24 | 49.52 | 49.15 |
| Tergitol TMN-6 | Dow Chemical | 0.72 | 0.71 | 0.70 | 0.72 | 0.73 |
| Dipropylene glycol dimethyl ether | Aldrich | 1.52 | 1.50 | 1.48 | 1.52 | 1.53 |
| Polyamic acid polymer | Chemours | 22.56 | 22.24 | 21.92 | 22.51 | 22.67 |
| Low Melt FEP Powder | Chemours | 14.75 | 0.00 | 6.62 | 0.00 | 0.00 |

-continued

| Ingredient | Supplier | Examples | | | | |
|---|---|---|---|---|---|---|
| | | C2 | C3 | 5 | C4 | C5 |
| PTFE Micropowder Zonyl ® - aqueous dispersion (55% solids) | Chemours | 0.00 | 26.43 | 14.03 | 14.41 | 0.00 |
| TE-9827 (Regular FEP dispersion, 60% solids) | Chemours | 0.00 | 0.00 | 0.00 | 11.33 | 25.92 |
| Total | — | 100 | 100 | 100 | 100 | 100 |

Stainless steel panels were cleaned with acetone and isopropanol, followed by heat treatment at 400° C. for 30 minutes in an oven. The substrates were then each coated with an Example 5 or Comparative Example 2-5 fluoropolymer coating composition by spray coating and dried for 15-20 minutes at 115-150° C. Each coated substrate was then further baked for 30 minutes at 287° C., resulting in a 4-10 micrometer thick coating on the substrate. The panels were tested for the following properties:

| Example | C2 | C3 | 5 | C4 | C5 |
|---|---|---|---|---|---|
| Appearance of coated panel | Clear Grit slippery | Off-white Smooth slippery | Semi clear Smooth slippery | Off-white Smooth slippery | Clear Smooth |
| Adhesion | | | | | |
| PWA-CH | Pass | Pass | Pass | Pass | Pass |
| PWA-Nail | Pass | Fail | Pass | Fail | Pass |
| Coefficient of Friction | | | | | |
| Static | 0.17 | 0.161 | 0.209 | 0.144 | 0.148 |
| Kinetic | 0.156 | 0.142 | 0.128 | 0.131 | 0.155 |

These results show that the low melt FEP surprisingly and efficiently helps adhesion. Comparative examples C3 and C4 contained no low melt FEP and failed adhesion. FEP only formulas of comparative examples C2 and C5 could not provide as low a kinetic coefficient of friction result as the present FEP/PTFE composition (example 5) comparative examples both C2 and C5 are higher kinetic coefficient of friction than example 5.

What is claimed is:

1. A fluoropolymer coating comprising high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g, wherein said high temperature resistant polymer binder comprises at least one member selected from the group consisting of polysulfones, polyethersulfones, polyimides, polyamide imides, polyamic acid salts and polyphenylene sulfide.

2. The fluoropolymer coating of claim 1 wherein said low melting tetrafluoroethylene/hexafluoropropylene copolymer has a melting point of about 250° C. or below by the method of ASTM D 4591.

3. The fluoropolymer coating of claim 1 wherein said low melting tetrafluoroethylene/hexafluoropropylene copolymer has a melting point of about 240° C. or below by the method of ASTM D 4591.

4. The fluoropolymer coating of claim 1 wherein said tetrafluoroethylene/hexafluoropropylene copolymer has a melting point that falls in the range of from about 40° C. below the melting point of said polymer binder to about 25° C. above the melting point of the polymer binder.

5. The fluoropolymer coating of claim 1 wherein said low melting tetrafluoroethylene/hexafluoropropylene copolymer has a melt flow rate of about 20 to about 60 by ASTM D 1238, measured at a temperature of 297° C. and a load of 2,060 g.

6. The fluoropolymer coating of claim 1 containing from about 25 to about 50 weight percent of said polymer binder from about 50 to about 75 weight percent of said tetrafluoroethylene/hexafluoropropylene copolymer and said polytetrafluoroethylene, said weight percents based on the combined dry weights of said polymer binder, said tetrafluoroethylene/hexafluoropropylene copolymer and said polytetrafluoroethylene.

7. The fluoropolymer coating of claim 1 wherein the fluoropolymer comprises from about 20 to about 60 weight percent of said tetrafluoroethylene/hexafluoropropylene copolymer and from about 40 to about 80 weight percent of said polytetrafluoroethylene, said weight percents based on the combined dry weights of said tetrafluoroethylene/hexafluoropropylene copolymer and said polytetrafluoroethylene.

8. A composition for forming a fluoropolymer coating comprising solvent, high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g, wherein said high temperature resistant polymer binder comprises at least one member selected from the group consisting of polysulfones, polyethersulfones, polyimides, polyamide imides, polyamic acid salts and polyphenylene sulfide.

9. The composition of claim 8 further comprising surfactant.

10. A process for forming a fluoropolymer coating on a substrate, comprising:
  i) applying to the surface of the substrate a coating composition comprising solvent, high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g, wherein said high temperature resistant polymer binder comprises at least one member selected from the group consisting of polysulfones, polyethersulfones, polyimides, polyamide imides, polyamic acid salts and polyphenylene sulfide,
  ii) removing said solvent from the coating composition on said substrate, and iii) heating the coating composition of said substrate at a temperature sufficient to melt said polymer binder and said tetrafluoroethylene/hexafluoropropylene copolymer, and, iv) cooling said coating composition to a temperature below the melting points of said polymer binder and said tetrafluoroethylene/hexafluoropropylene copolymer to form said fluoropolymer coating on said substrate.

11. The process of claim 10 wherein said substrate comprises nitinol.

12. An coated substrate having a coating composition comprising high temperature resistant polymer binder, low melting tetrafluoroethylene/hexafluoropropylene copolymer having a melting point of below 255° C. by the method of ASTM D 4591, and low molecular weight polytetrafluoroethylene having a heat of crystallization of at least about 50 J/g, wherein said high temperature resistant polymer binder comprises at least one member selected from the group consisting of polysulfones, polyethersulfones, polyimides, polyamide imides, polyamic acid salts and polyphenylene sulfide.

13. The coated substrate of claim 12 wherein said substrate comprises nitinol.

14. The coated substrate of claim 12 wherein the dry film thickness of said coating is from about 0.1 to about 0.4 mils.

15. The coated substrate of claim 12 wherein said coating has a static coefficient of friction of about 0.2 or less and a kinetic coefficient of friction of about 0.17 or less, said coefficients of friction measured by the method of ASTM 1894.

* * * * *